(12) United States Patent
Wong

(10) Patent No.: US 10,010,105 B2
(45) Date of Patent: Jul. 3, 2018

(54) JUICER

(71) Applicant: Yan Kwong Wong, Kowloon (HK)

(72) Inventor: Yan Kwong Wong, Kowloon (HK)

( * ) Notice: Subject to any disclaimer, the term of this patent is extended or adjusted under 35 U.S.C. 154(b) by 1008 days.

(21) Appl. No.: 14/448,865

(22) Filed: Jul. 31, 2014

(65) Prior Publication Data

US 2014/0352558 A1 Dec. 4, 2014

Related U.S. Application Data

(63) Continuation-in-part of application No. PCT/IB2013/050469, filed on Jan. 18, 2013.

(30) Foreign Application Priority Data

Feb. 5, 2012 (HK) .................................. 12101080.5

(51) Int. Cl.
| | | |
|---|---|---|
| *A23N 1/02* | (2006.01) | |
| *A47J 19/00* | (2006.01) | |
| *A47J 19/02* | (2006.01) | |
| *A47J 19/06* | (2006.01) | |
| *A47J 43/25* | (2006.01) | |

(52) U.S. Cl.
CPC .............. *A23N 1/02* (2013.01); *A47J 19/005* (2013.01); *A47J 19/022* (2013.01); *A47J 19/06* (2013.01); *A47J 43/255* (2013.01)

(58) Field of Classification Search
CPC ...... A47J 43/255; A47J 19/005; A47J 19/025; A47J 19/022; A47J 19/06; A23N 1/02; B30B 9/20; B30B 9/205; B30B 9/325; B30B 11/003

USPC ....................................................... 100/98 R
See application file for complete search history.

(56) References Cited

U.S. PATENT DOCUMENTS

| | | | | |
|---|---|---|---|---|
| 4,925,117 A | * | 5/1990 | Ramos ................ | B02C 19/0081 241/100 |
| 5,369,884 A | * | 12/1994 | Chen ......................... | B30B 9/20 241/293 |
| 5,462,425 A | * | 10/1995 | Kuss ......................... | B30B 9/20 100/116 |

FOREIGN PATENT DOCUMENTS

CN 102151061 A * 8/2011

* cited by examiner

*Primary Examiner* — Jimmy T Nguyen
(74) *Attorney, Agent, or Firm* — Gloria Tsui-Yip, Esq.; Gottlieb, Rackman & Reisman, P.C.

(57) ABSTRACT

A juicer including a juicing device and a driving device adapted for driving a juicing device, the juicing device includes a container and a roller being rotatably mounted inside the container, the roller is adapted to be driven by the driving device, the roller includes first and second cutting plates being projected outwardly from an outer surface of the roller, a juice outlet and a residue outlet are positioned on a container wall, a plurality of cutting plate receivers is arranged on the outer surface of the roller and is adapted for allowing the first and second cutting plates to be slidingly mounted inside the cutting plate receivers, the first cutting plate includes at least one cutting member having a convex structure mounted on a surface of the first cutting plate.

17 Claims, 21 Drawing Sheets

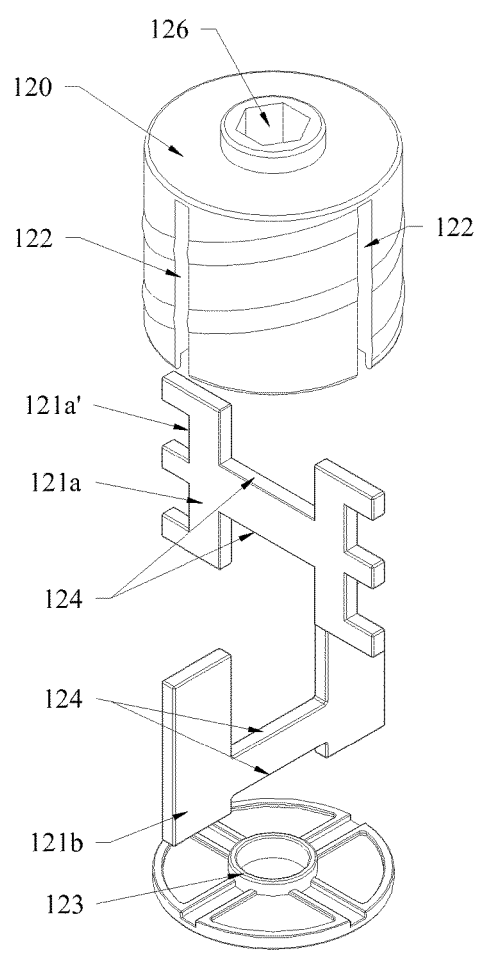 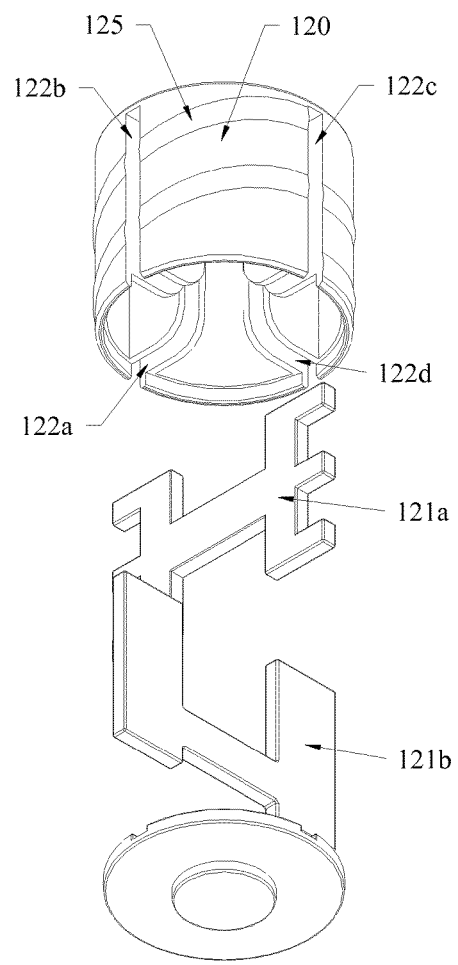
FIG. 5cFIG. 5d

JUICER

This application claims the benefit of PCT International Patent Application Serial No. PCT/IB2013/050469 filed on Jan. 18, 2013, which claims priority to Hong Kong Patent Application Serial No. 12101080.5 filed on Feb. 5, 2012, both of which are hereby incorporated by reference.

FIELD OF THE INVENTION

The present invention relates broadly to a food processing device. More specifically, the present invention relates to a juicer.

BACKGROUND OF THE INVENTION

Originally, there are two main types of juicers in the market, they are clamping type juicers and rolling type juicers. In respect of the clamping type juicer, it is to obtain fruit juice or vegetable juice by squeezing fruits or vegetables with a pressure plate through a manual driving lever. Basically, the user's hand will not directly contact the fruits or vegetables inside the clamping type juicer such that the juicer is relatively clean and healthy. Although the energy-saving lever is applied to the juicer, a pressure is still required to be applied to the lever by the user; therefore, it is extremely strenuous and inconvenient to operate. On the other hand, the rolling type juicer is to squeeze the fruit juice or vegetable juice by rolling the fruits or vegetables with a rotatable roller. The fruit residues produced by rolling the fruits or vegetables with the roller will not automatically discharge, and the residues is required to be removed by the user. In the circumstances, it is inconvenient because the residues inside the juicer are not able to be removed automatically although the rolling type juicer saves more energy than the clamping type juicer.

SUMMARY OF THE INVENTION

The problem to be solved in the present invention is to solve the existing technical problem of poor quantity of juice obtained by the existing juicers due to low cutting efficiency of the existing juicers. Another problem to be solved is to solve the existing technical problem of incapability of discharging food residues automatically of the existing juicers after cutting and to provide a juicer with functionality of discharging food residues automatically. Another problem to be solved is to solve the existing technical problem of incapability of repeated juicing process of the existing juicers.

Another problem to be solved in the present invention is to solve the existing technical problem of wasting energy in the juicing process. Another problem to be solved in the present invention is to solve the vibration problem of the existing juicers during the juicing process.

The present invention provides a juicer comprising a juicing device and a driving device adapted for driving said juicing device, wherein said juicing device comprises a container and a roller being rotatably mounted inside said container, said roller is adapted to be driven by said driving device, said roller comprises first and second cutting plates being projected outwardly from an outer surface of said roller, a juice outlet and a residue outlet are positioned on a container wall, a plurality of cutting plate receivers is arranged on the outer surface of said roller and is adapted for allowing said first and second cutting plates to be slidingly mounted inside said cutting plate receivers, said first cutting plate comprises at least one cutting member having a convex structure mounted on a surface of said first cutting plate.

Typically, at least one cutting member is substantially vertically mounted on a surface of said first and second cutting plates.

Typically, said first cutting plate comprises an extending member mounted to an end of said first cutting plate, a least two said cutting members are substantially vertically mounted to an end portion of the opposing surfaces of said extending member.

Typically, at least two cutting members are substantially vertically mounted to first and second surfaces of said second cutting plate.

Typically, said cutting member comprises a cutting portion adapted for cutting the food inside said container and a food mounting portion adapted for mounting the food inside said container.

Typically, said roller further comprises a cutting plate means adapted for slidingly mounting said first and second cutting plates and allowing said first and second cutting plates to be moved radially inside said roller.

Typically, said cutting plate means comprises a cutting plate extending member and a cylindrical member, two opposing end portions of said cutting plate extending member are mounted to inner end portions of a pair of said first or second cutting plates, said cylindrical member is adapted for allowing said cutting plate extending member of said first and second cutting plates to be slidingly mounted to said cylindrical member, said cutting plate extending member is mounted between a pair of said first cutting plates, said cutting plate extending member is mounted between a pair of said second cutting plates, opposing ends of said cutting plate means are removably mounted to inner end surfaces of said roller.

Typically, the length of an end of said cutting plate extending member is less than the length of an inner end of said first or second cutting plate.

Typically, said cutting plates means comprises at least two holes for receiving said cutting plate extending member, said cutting plate extending member is adapted to move along two said holes, the width of said hole is less than the length of the end of said first or second cutting plate adjacent to said cutting plate extending member.

Typically, said cutting plate receiver comprises a cutting plate receiver wall, the side of said cutting plate receiver is extending towards the central axis of said roller.

Typically, said cutting plate means comprises first and second portions, said first and second portions are removably mounted together and defined as a cylindrical member, opposing ends of said first and second portions comprise trapezoid structures.

Typically, two said first or second cutting plates and said cutting plate extending member unitarily form an "H" shaped structure.

Typically, a receiver for juice and residue is arranged below said container, said receiver for juice and residue comprises a juicer receiver adjacent to said juice outlet and a residue receiver adjacent to said residue outlet, said residue receiver is arranged above said juicer receiver, a plurality of juice hole forming a passage to said juice receiver are arranged on the bottom surface of said residue receiver, a longitudinal convex member being arranged on a side of a base of said juicer is mounted to a surface of said receiver for juice and residue, said base comprises a mounting member adapted for mounting said juicer on a surface of an object and reducing the vibrational force during juicing process.

Typically, said juice outlet is a hole arranged on said container wall, said hole is covered by a filter.

Typically, said cutting plate receiver is arranged inside said roller, said first or second cutting plate is slidingly mounted inside said cutting plate receiver, a remaining portion of said roller comprises a solid structure adapted for disallowing the residues or juices inside said container from entering into said remaining portion.

Typically, said outer surface of said roller comprises a convex threaded structure.

Typically, said cutting plate receiver is arranged towards the center axis of said roller, said first or second cutting plate is adapted to be move radially along said cutting plate receiver.

Typically, said first or second cutting plate is slidingly mounted along two opposing said cutting plate receivers.

Typically, said outer surface of said roller comprises an inclined convex structure, a shaft hole of said cylindrical member comprises a plurality of right angled structures arranged on the inner wall of the shaft hole, the spacing between said roller and said container wall forming a passage for fruits and vegetables, said passage for fruits and vegetables comprises an input portion adapted for allowing fruits or vegetables entering into said passage for fruits and vegetables and an output portion adapted for discharging fruits or vegetables from said passage for fruits and vegetables, the spacing between said roller and said container wall adjacent to said input portion is larger than the spacing between said roller and said container wall adjacent to said output portion.

Typically, the spacing between said roller and said container wall is gradually decreased from said input portion to said output portion of said passage for fruits and vegetables, said driving device comprises a driving shaft adapted for rotating said roller, a supporting member mounted to said container, a driving member adapted for driving said driving shaft and a shaft hole arranged on an end of said cutting plate means, said driving member is a turning handle or a machine.

The juicer of the present invention has the following advantages: the fruits or vegetables can be squeezed by a roller driven by a driving device in a container to form fruit juice or vegetable juice to discharge from a juice outlet; while fruit residues or vegetable residues are scraped by cutting plates mounted on the roller to a residue outlet, so as to separate the juice from the residues, thereby automatically discharging residues.

Further, the spacing between the roller and the container wall forms a passage for fruits and vegetables. When the fruits and vegetables enter from an input portion of the passage for fruits and vegetables, the roller and the container wall will squeeze the fruits or vegetables to crush utricles of the fruits or vegetables, and thus making the fruit juice or vegetable juice out of the fruits or vegetables and automatically discharging from the juice outlet at the lowest portion of the passage for fruits and vegetables. A filter is mounted at the juice outlet, so that the fruit residues cannot be discharged from the juice output. The remained fruit residues are brought by cutting plates convexly mounted to the outer surface of the said roller to the output portion of the passage for fruits and vegetables along the container wall to discharge from the residue outlet, thereby automatically discharging the residues. It is more convenient to operate, and the problems of being not clean, inconvenient and time-consuming due to manual discharging residues are avoided. In addition, the cutting plate also can bring along the fruits or vegetables to enter into the passage for fruits and vegetables, so as to prevent the fruits or vegetables from remaining in the input portion of the passage for fruits and vegetables.

BRIEF DESCRIPTION OF THE DRAWINGS

This and other objects, features and advantages of the present invention will become apparent upon reading of the following detailed descriptions and drawings, in which:

FIG. 5b shows a sectional view of the roller of FIG. 5a;

FIG. 5c shows a first exploded view of the roller of FIG. 5a;

FIG. 5d shows a second exploded view of the roller of FIG. 5a;

DESCRIPTION OF THE PREFERRED EMBODIMENTS

The present invention relates to a juicer comprising a juicing device and a driving device adapted for driving the juicing device. In a first embodiment of the present invention, the juicing device comprises a container 110 and a roller 120 being rotatably mounted inside the container 110. The roller 120 is adapted to be driven by the driving device. The roller 120 comprises cutting plates including first and second cutting plates which are projected from an outer surface of the roller. Further, a juice outlet 111 and a residue outlet 112 are positioned on a container wall. In a first embodiment, fruit or vegetable are being squeezed due to rolling motion of the roller 120 and the pressure formed between the roller and the container wall. As such, the skin of fruit or vegetable will be broken in order to produces fruit juice or vegetable juice and then the fruit juice or vegetable juice discharges from the juice outlet 111, while fruit residues or vegetable residues discharge from the residue outlet 112, so that automatic residue discharge can be performed by the present invention and manual residue discharge is not required. It is more convenient and easy to clean.

Figure 1:
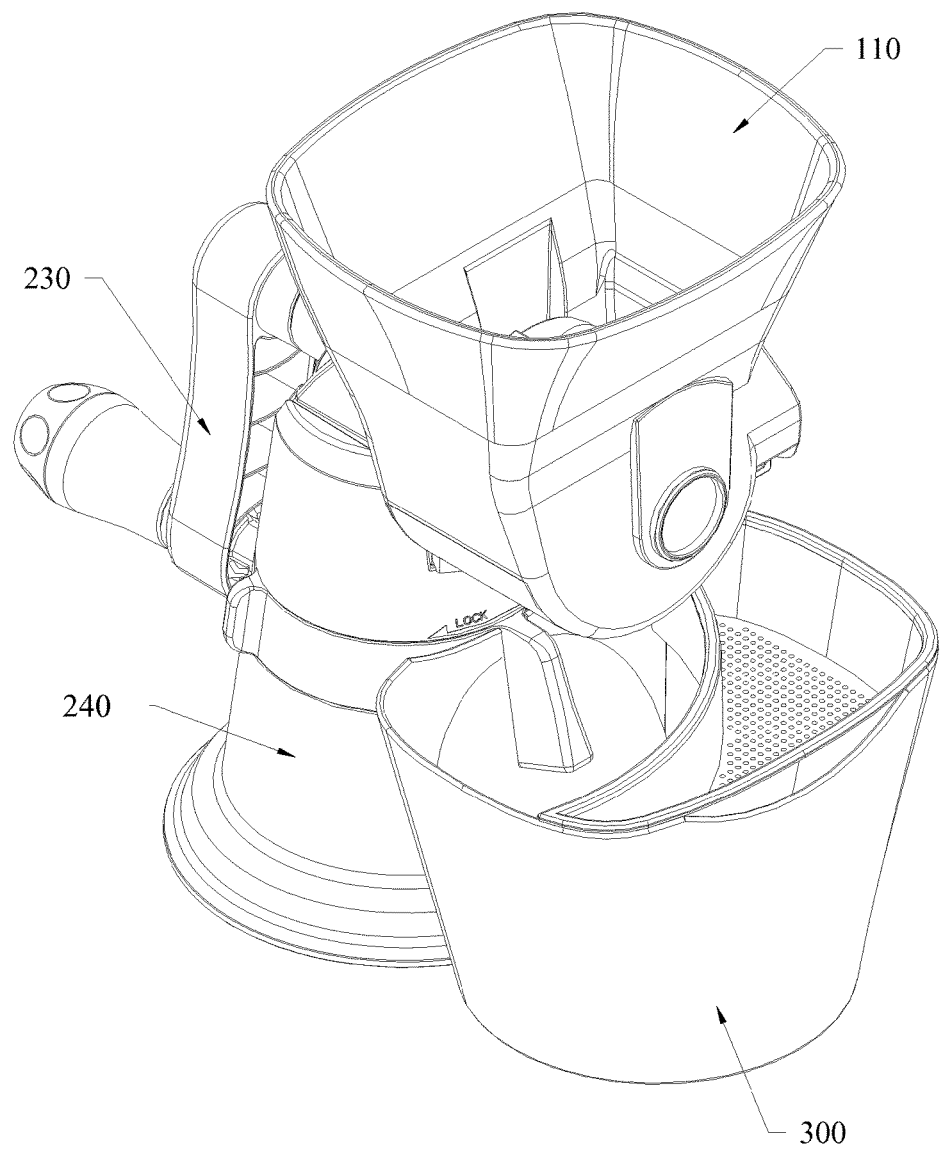
FIG. 1 shows a perspective view of a first embodiment of the present invention.
Figure 2:
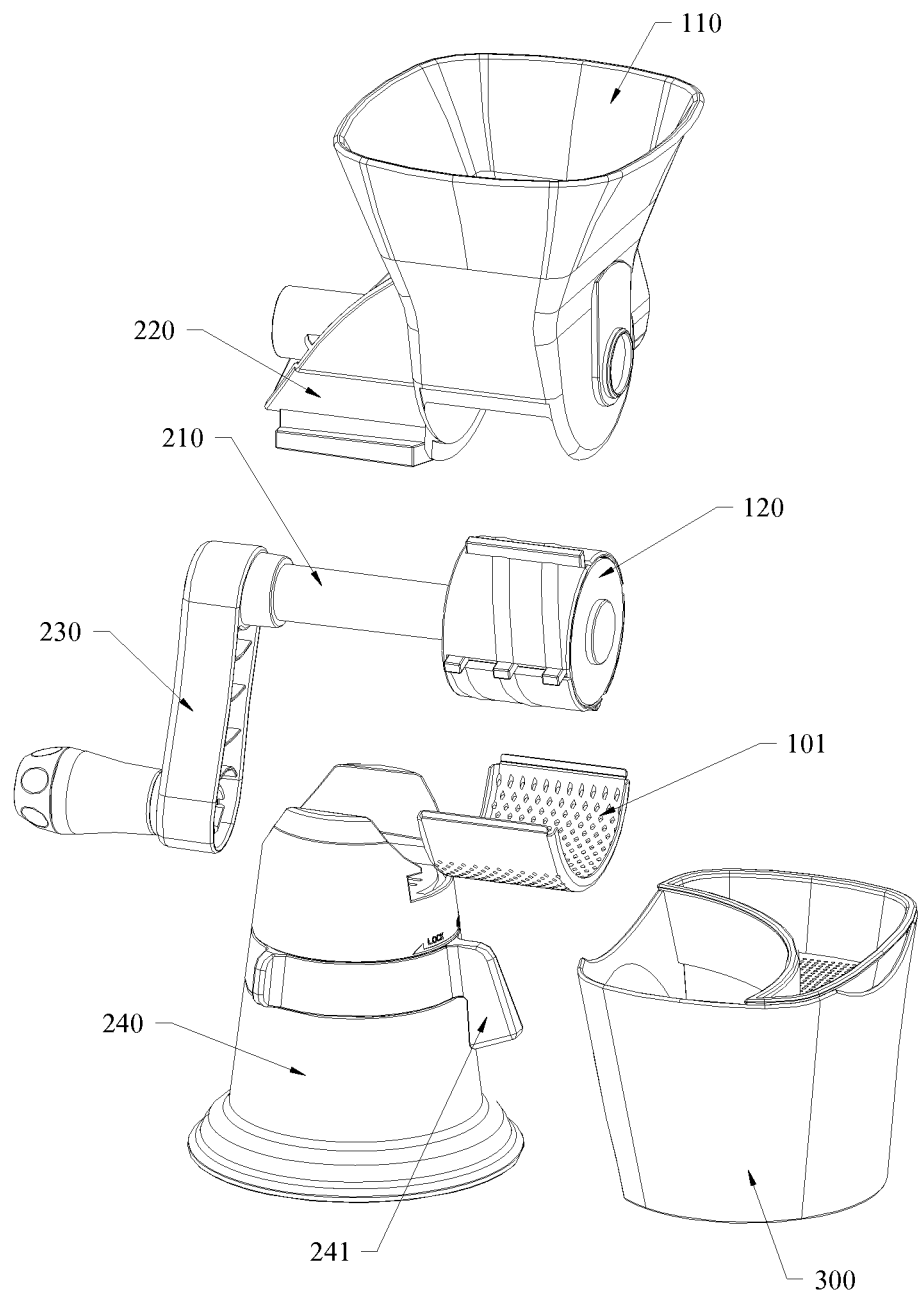
FIG. 2 shows an exploded view of the first embodiment of the present invention.
Figure 3:
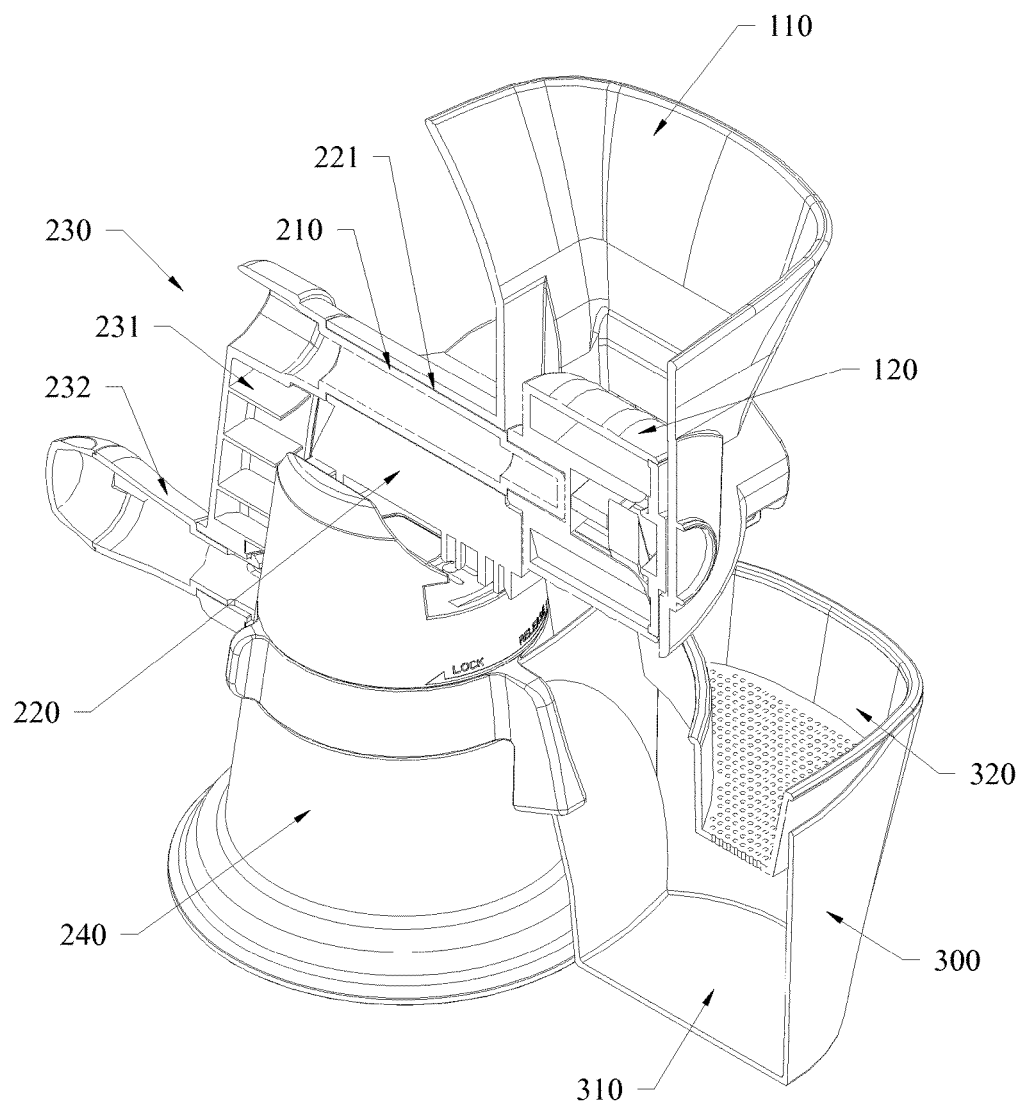
FIG. 3 shows a three-dimensional sectional view of the first embodiment of the present invention.
Figure 4:
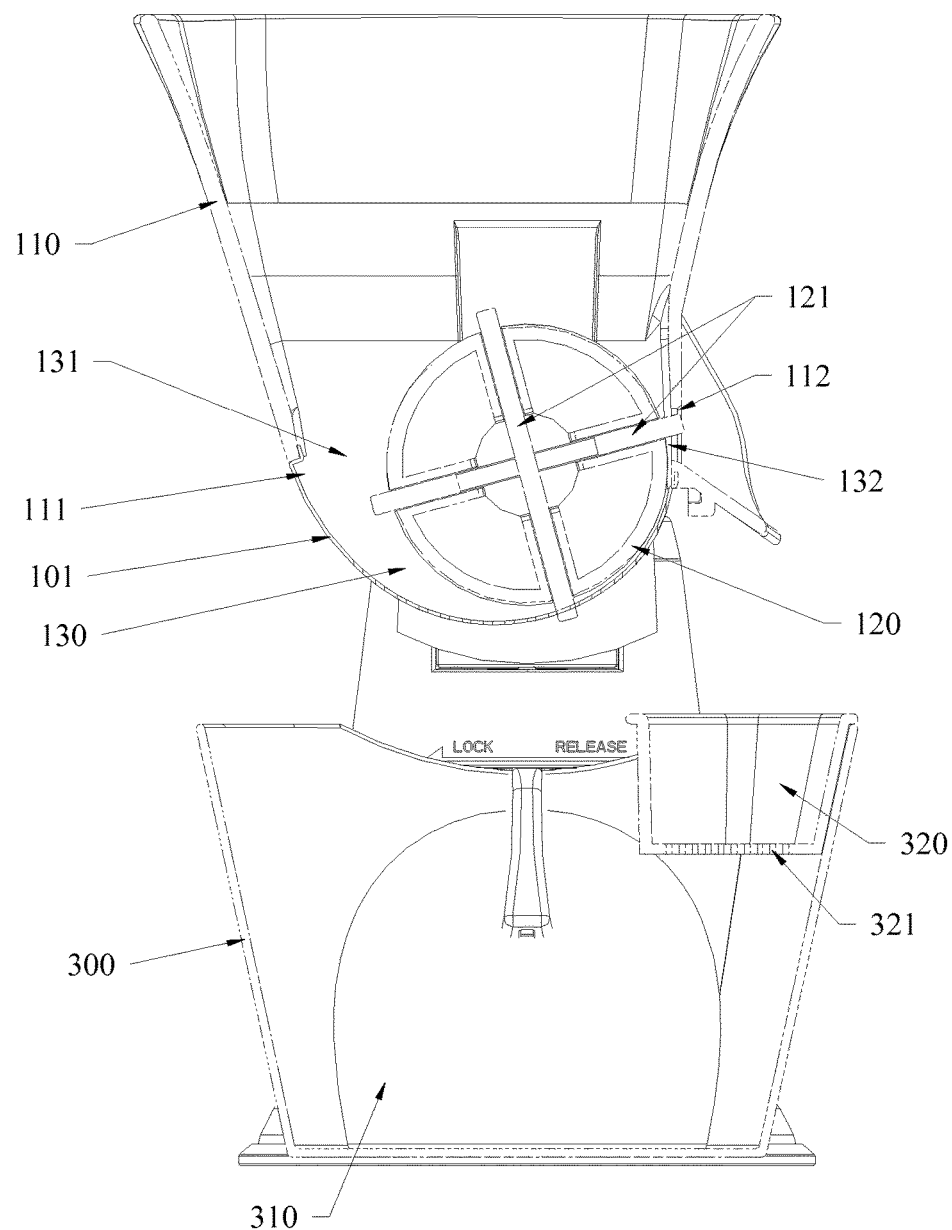
FIG. 4 shows a sectional view of the first embodiment of the present invention.

As shown in FIG. 1, FIG. 2, FIG. 3 and FIG. 4, in the first embodiment of the said juicer of the present invention, the juicing device comprises the container 110 and the roller 120 which is driven by the driving device. In particular, the roller 120 is rotatably mounted inside the container 110. Preferably, the roller 120 is mounted inside the bottom portion of the container. Advantageously, at least two concave regions are arranged on opposing inner walls of the container. At least two convex members adapted for being received by the concave regions are mounted to opposing ends of the roller such that the roller can therefore be rotatably mounted inside the container. Referring to FIG. 4, the spacing between the outer surface of the roller and the container wall forms a passage for fruits and vegetables 130 for squeezing the fruits or vegetables. The passage for fruits and vegetables 130 comprises an input portion 131 and an output portion 132. As shown in FIG. 4, when the roller 120 is driven by the driving device to rotate in an anti-clockwise direction, the fruits or vegetables enter from the left side of the roller 120 and are scrapped out by a first or second cutting plate 121 from the right side of the roller 120, that is to say, the input portion 131 of the passage for fruits and vegetables 130 is located at the left side of the roller 120 and the output portion 132 of the passage for fruits and vegetables is located at the right side of the roller 120 (the left and right positions are orientation shown in FIG. 4.). The juice outlet 111 is arranged at a lowest portion of the passage for fruits and vegetables 130 on the container wall for filtering the fruit residues or vegetable residues to separate the juice from the residues. Specifically, the fruit juice or the vegetable juice may discharge from the juice outlet 111 while the fruit residues or vegetable residues may not discharge from the juice outlet 111. Preferably, the juice outlet 111 is of a mesh structure. More specifically, the juice outlet 111 can be formed as a mesh shape when fabricating the container wall. In this embodiment, the juice outlet 111 can be a hole arranged on the container wall, the hole are covered by a filter 101 so that the fruit juice or vegetable juice may be discharged from the juice outlet 111 through the filter 101 while the fruit residues continue to be moved by the first or second cutting plate 121 along the surface of the filter 101. Furthermore, it is convenient to clean the filter by removing the filter from the container 110 so as to prevent any remaining residues storing inside the passage for fruits and vegetables 130. The residue outlet 112 is arranged at a position of the container wall adjacent to the output portion 132 of the passage for fruits and vegetables for discharging the fruit or vegetable residue. The first or second cutting plate 121 being arranged on the roller 120 is used for pushing the fruits or vegetables into the passage for fruits and vegetables 130 and scrapping the fruits or vegetables residues which are squeezed and/or pressured by the roller 120 and the container wall out along the container wall of the passage for fruits and vegetables 130. The residues are then removed from the container through the residue outlet 112.

As shown in FIG. 5a, FIG. 5b, FIG. 5c and FIG. 5d, in the first embodiment, a cutting plate receiver 122 is arranged on the outer surface of the roller. The first or second cutting plate 121 is removably mounted inside the cutting plate receiver 122. Preferably, a spacing can be arranged between the cutting plate receiver 122 and the first or second cutting plate 121 and the first or second cutting plate 121 is inserted into the corresponding cutting plate receiver 122. In this way, when rotating to the lower half portion of the roller 120, the first or second cutting plate 121 can slides along the cutting plate receiver 122 by the action of its own gravity and eventually adheres to the container wall of the passage for fruits and vegetables 130. Preferably, the end portion of first or second cutting plate 121 and a portion of the container wall can be received together in order to thoroughly scrape out the fruit or vegetables residues hoarded inside the passage for fruits and vegetables 130. Preferably, the cutting plate receiver 122 is arranged towards the center axis of the roller 120 so that the first or second cutting plate 121 is adapted for moving radially inside the roller 120 through the sliding motion of the first or second cutting plate 121 along the cutting plate receiver 122. The fruit or vegetable residues are conveniently removed from the passage 130 and prevented from being stuck inside the passage for fruits and vegetables 130. In this embodiment, the roller 120 comprises a cutting plate receiver 122a, a cutting plate receiver 122b, a cutting plate receiver 122c and a cutting plate receiver 122d. Preferably, two separate cutting plate receivers 122a and 122c are mounted on the outer surface of the roller 120 by way of taking the center axis of the roller as a symmetrically center line, and the first or second cutting plate 121 is arranged inside each cutting plate receiver 122. In this embodiment, preferably, the cutting plates corresponding to the two symmetric cutting plate receivers 122a and 122c are to be unitarily formed as a whole. The said two cutting plates are unitarily formed as a whole and arranged inside the two cutting plate receivers 122a and 122c and can slide along the two cutting plate receivers 122a and 122c. In this embodiment, two cutting plates 121a and 121b are provided, wherein a side of the first cutting plate 121a contacting with the container wall comprises a concave portion 121a' so that the end of the first cutting plate 121a forms a gear rack structure. Alternatively, a plurality of extending members is mounted to an end of the first cutting plate 121a. Advantageously, the extending members can be projected outwardly from an outer end of the first cutting plate 121a. A gear rack structure of the first cutting plate 121a can also be formed by the plurality of extending members. The first or second cutting plate 121 which is of the gear rack structure can cut the fruits or the vegetables in order to break their skins and improve the effectiveness of juicing. Alternatively, additional cutting plate receivers 122 and cutting plates 121 may also be arranged according to the user's need. Preferably, the first cutting plate 121a with at least one concave portion 121a' and the second cutting plate 121b without the concave portion can be alternatively arranged along the outer surface of the roller 120. As such, the juice is squeezed more thoroughly after the squeezed fruits or vegetables are cut by the first cutting plate 121a which is of the gear rack structure (the cutting plate with at least one concave portion), and the fruit or vegetable residues are scrapped out by the following second cutting plate.

In a second embodiment of the present invention and referring to FIGS. 5e, 5f, 5g and 5h, the structure of the roller is improved upon the above embodiment. A sharp convex structure or cutting member 400 projecting from a surface of the cutting plate is arranged at an end portion of the cutting plate 121. Specifically, the sharp convex structure or cutting member 400 can be mounted on the end portion of the cutting plate 121. More specifically, the sharp convex structure or cutting member 400 can be mounted on opposing end portions or first and second surfaces of the cutting plate 121 for the purpose to perform cutting when the roller 120 rotates clockwisely and counter-clockwisely. During the rotation motion of the cutting plate 121 driven by the roller 120, the cutting member or sharp convex structure 400 is adapted to cut the fruits or vegetables inside the passage 130 and further apply more cutting force to the residues.

Alternatively, in the second embodiment, a plurality of cutting plates 121 is arranged along the roller forming a cutting plate means 121' and then mounted to the roller through the cutting plate receiver according to the first embodiment. In this embodiment, a total of six cutting plates 121 are arranged along the roller. Typically, it is similar to the first embodiment in that some of the cutting plates are provided with the concave portion or extending member and the other is not provided with the concave portion or extending member. As shown in FIG. 5g, the six cutting plates are mounted together through a cylindrical member 500 to form the cutting plate means 121'. Alternatively, the six cutting plates 121 and the cylindrical member 500 can be of a unitary structure forming as the cutting plate means 121' which is of a fixed structure. Alternatively, the cutting plates 121 can be mounted to the cylindrical member 500. For instance, the cylindrical member 500 comprises a hole, the cutting plate 121 comprises a cutting plate extending member 403, the cutting plate extending member 403 and the above hole are adapted to be received together in order that the cutting plates 121 are able to be slidingly mounted to the cylindrical member 500. Alternatively, the six cutting plates 121 are separated into three pairs of cutting plates 121. Preferably, each pair of cutting plates 121 are mounted together through connection between the cutting plate extending members 403 and the pair of cutting plates 121. As such, an "H" shaped structure is formed from the pair of cutting plates 121. Three "H" shaped structures can therefore be moved radially inside the roller according to the second embodiment. Preferably, the cylindrical member 500 comprises three sets of holes or three pairs of holes arranged on the wall of the cylindrical member 500 and more specifically, the cylindrical member 500 is adapted to be dismounted into two parts along the three sets of holes or the three pairs of holes, the two parts of the cylindrical member 500 is adapted to be re-mounted together through a locking structure. Typically, the three "H" shaped structures is adapted to partially received by the three sets of holes or the three pairs of holes of the cylindrical member 500. Alternatively, the extending members of the cutting plates 121 can be received and moved inside the three sets of holes or the three pairs of holes of the cylindrical member 500. According to the above arrangement, the extending member of each pair of the cutting plates 121 is restricted to be moved along each pair of holes of the cylindrical member 500 so that all cutting plates 121 are adapted for sliding radially inside the cylindrical member 500 at a point of time independently. As shown in FIG. 5h, when installation of the cutting plate means 121', the cylindrical member 500 is firstly disassembled, the three sets of cutting plates 121 or the three pairs of cutting plates 121 are put into the holes of half of the disassembled cylindrical member 500, and then the other half of the disassembled cylindrical member is mounted such that the three sets of cutting plates or three pairs of cutting plates 121 are mounted inside the cylindrical member 500 to form the cutting plate means 121'.

In the first embodiment, in order to prevent the first or second cutting plate 121 from being removed from the cutting plate receiver 122, the roller 120 is of a hollow structure according to the first embodiment, the cutting plate receiver 122 is arranged on the outer wall of the roller 120. Preferably, two inner convex member 123 are mounted to two opposing ends of the roller 120, a central concave portion 124 is arranged in the middle of the first or second cutting plate 121, the inner convex member 123 are corresponded with the central concave portion 124 to prevent the first or second cutting plate 121 from being removed from the roller 120. Preferably, a larger spacing exists between the inner convex member 123 and the central concave portion 124 to ensure the first or second cutting plate 121 can freely slides along the cutting plate receiver 122.

In the first embodiment, referring to FIG. 5a to FIG. 5d, an inclined convex structure 125 can be further mounted on the outer surface of the roller 120. When the roller 120 is rotating, the convex structure 125 provides a resistance force against the fruits or vegetables in the input portion 131 of the passage for fruits and vegetables 130 (which is the portion that the fruits or vegetables first entering into the passage 130) in a direction towards the direction of rotation of the roller 120 so as to squeeze the fruits or vegetables into the passage for fruits and vegetables 130 to prevent the fruits or vegetables from remaining in the input portion 131 of the passage for fruits and vegetables 130.

In the first embodiment, the spacing between the roller 120 and the container wall adjacent to the input portion 131 of the passage for fruits and vegetables is larger than the spacing adjacent to the output portion 132 of the passage for fruits and vegetables. It is preferably to make the spacing between the roller 120 and the container wall become smaller starting from the input portion 131 to the output portion 132 of the passage for fruits and vegetables 130. As a result, after the first or second cutting plate 121 brings the fruits or vegetables into the passage for fruits and vegetables 130, the volume of the passage for fruits and vegetables 130 between two adjacent cutting plates 121 and the container wall becomes smaller starting from the input portion 131 to the output portion 132 of the passage 130 so that the volume for squeezing and/or juicing the fruits or vegetables will then become smaller. Due to the gradually increase of resistance force by diminishing the volume of the spacing between the two adjacent cutting plates 121 through the different portions of the passage 130, the present invention can greatly improve the efficiency in juicing. Advantageously, as shown in FIG. 6a to FIG. 6e, a plurality of cutting plates 121 is provided, the passage for fruits and vegetables 130 is therefore divided into a plurality of enclosed spacing 133. Typically, the plurality of enclosed spacing 133 will become smaller because the spacing between the roller 120 and the container wall becomes smaller along with the direction of rotation of the roller 120. Therefore, the fruits or vegetables inside the above enclosed spacing 133 will be squeezed or juiced step by step to further make juicing more thoroughly.

Figure 6A:
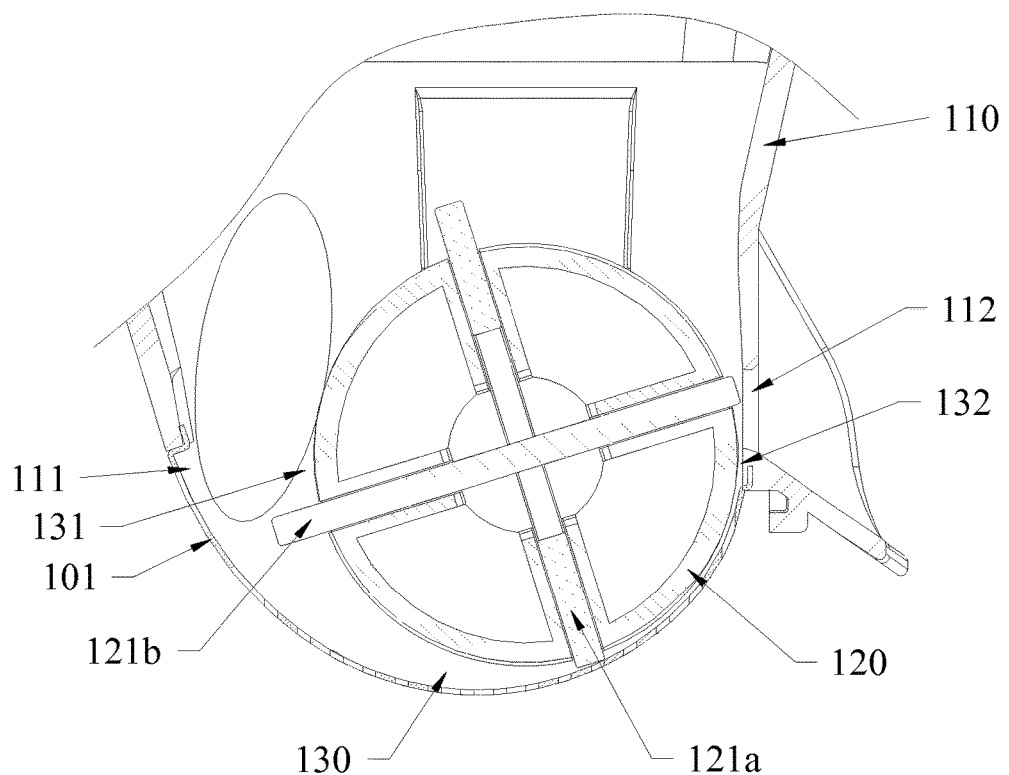
FIG. 6a shows a first view of the roller of the first embodiment of the present invention.
Figure 6B:
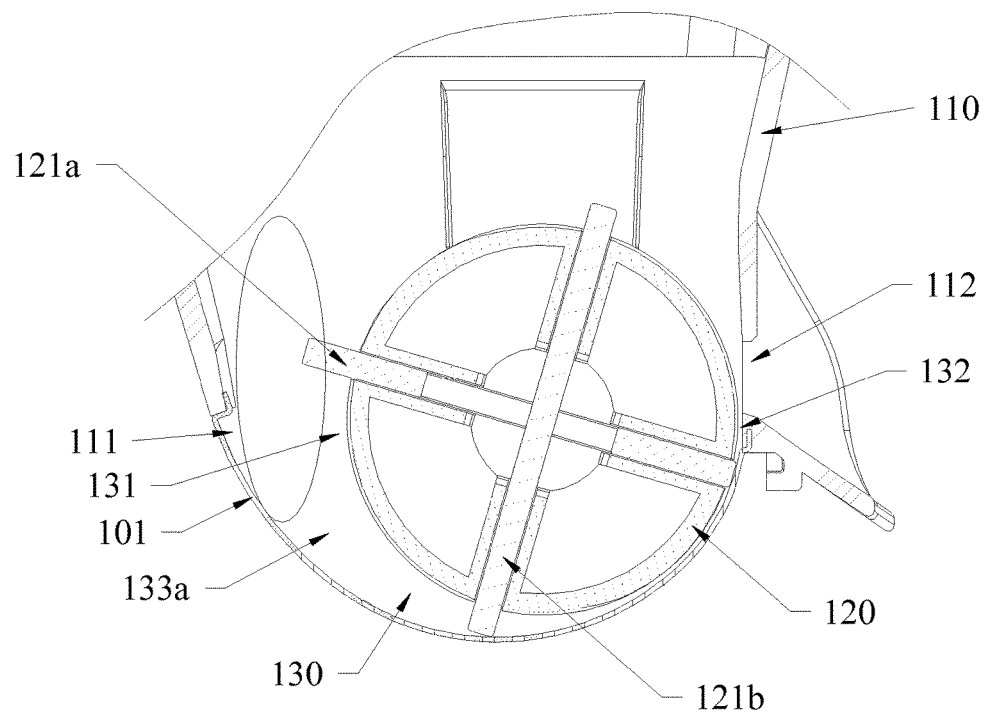
FIG. 6b shows a second view of the roller of the first embodiment of the present invention.
Figure 6C:
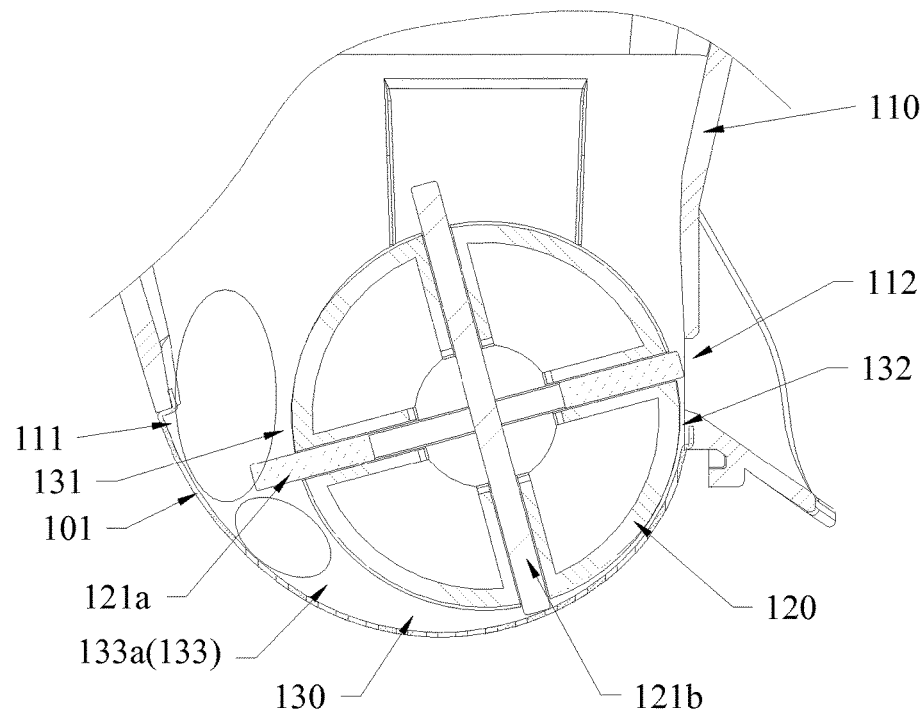
FIG. 6c shows a third view of the roller of the first embodiment of the present invention.
Figure 6D:
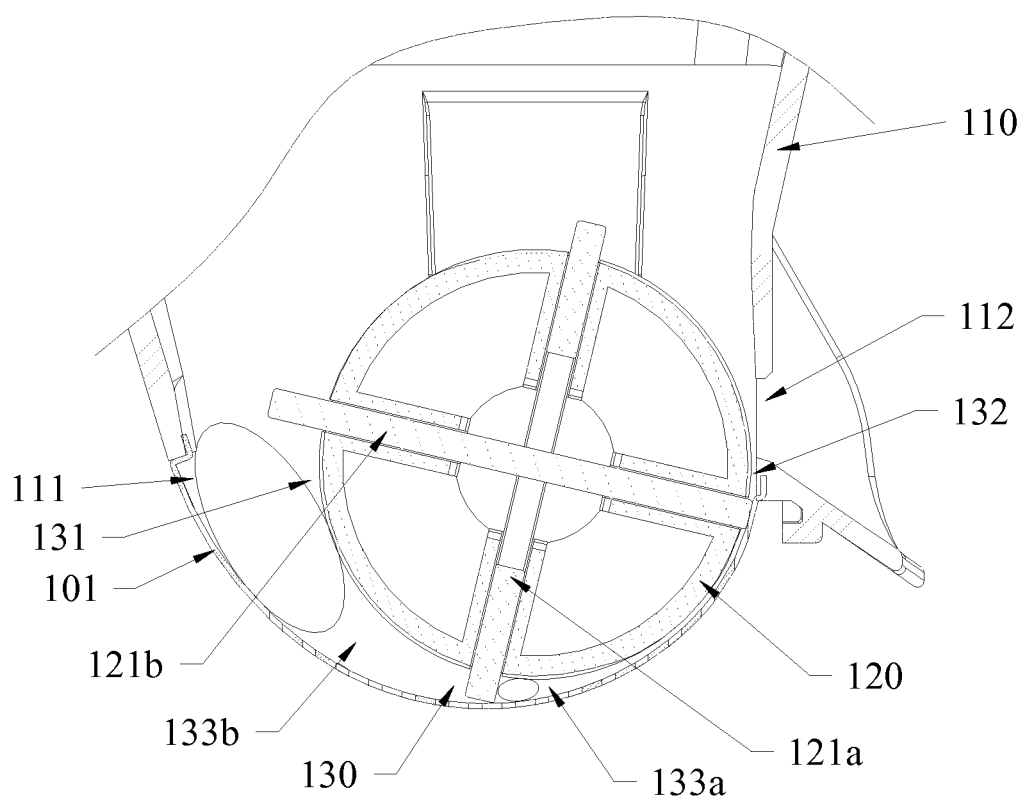
FIG. 6d shows a fourth view of the roller of the first embodiment of the present invention.
Figure 6E:
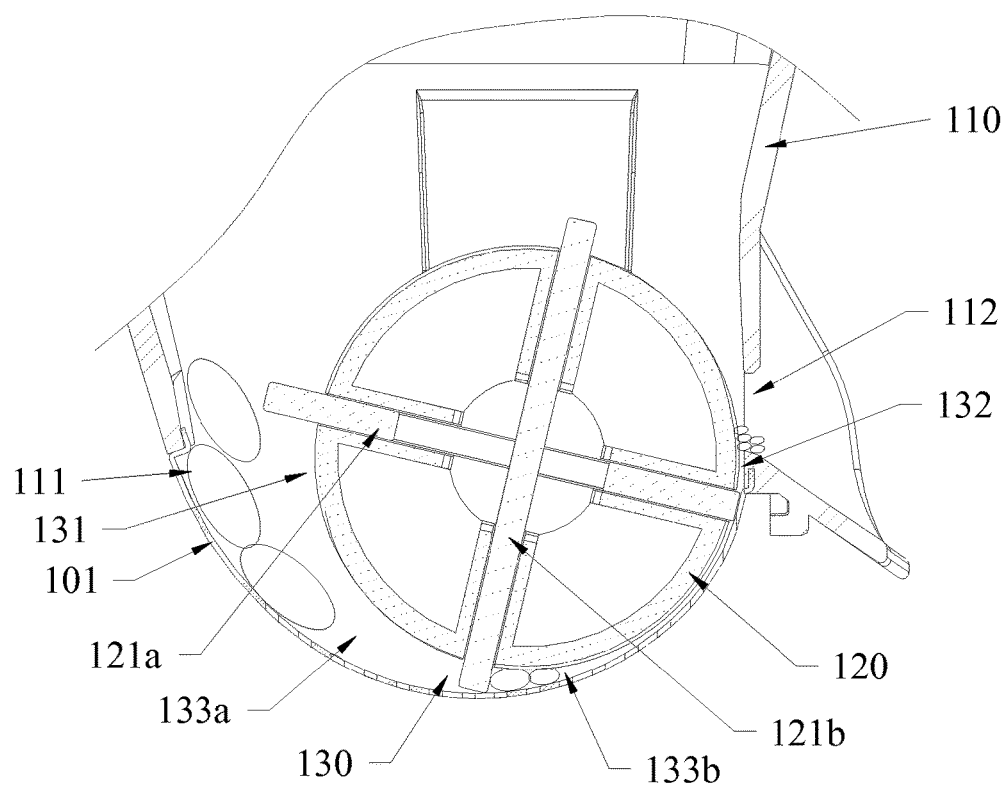
FIG. 6e shows a fifth view of the roller of the first embodiment of the present invention.
Figure 7:
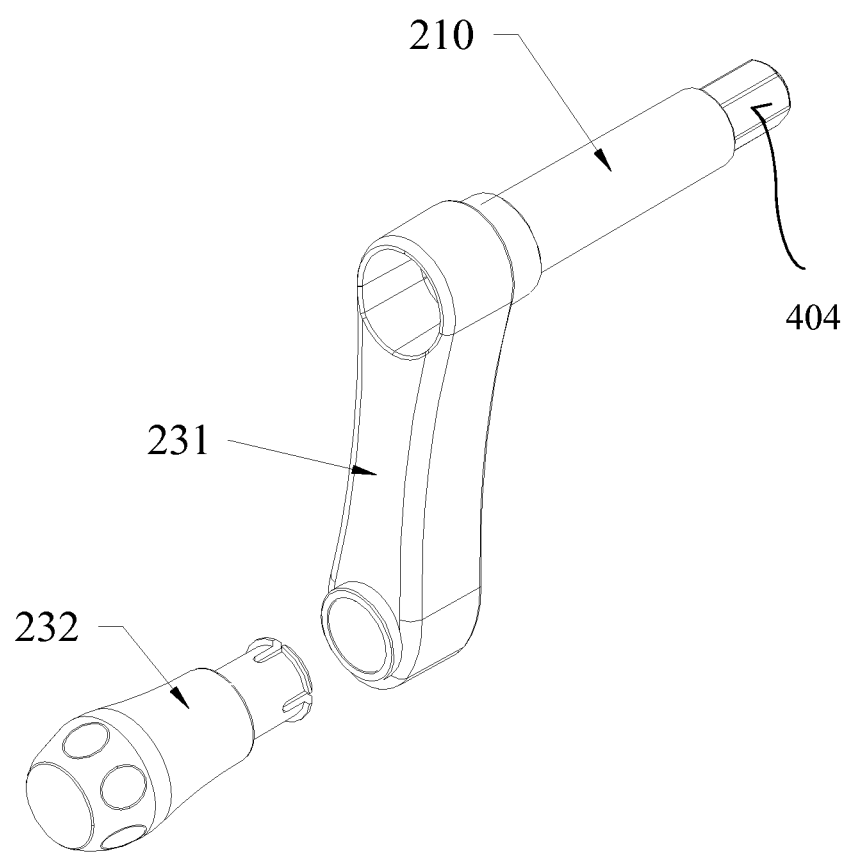
FIG. 7 shows an exploded view of a handle of the first embodiment of the present invention.
Figure 8:
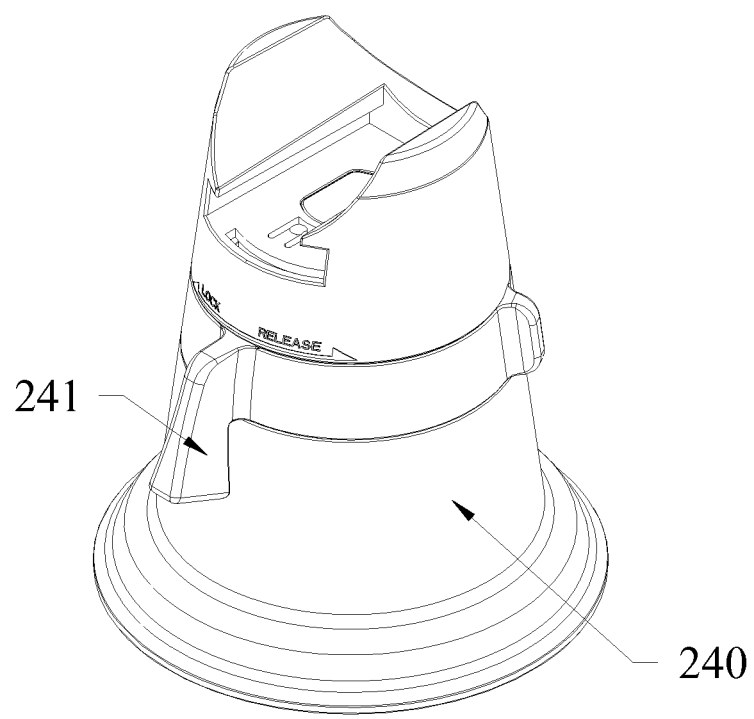
FIG. 8 shows a perspective view of a support member of the first embodiment of the present invention.
Figure 9:
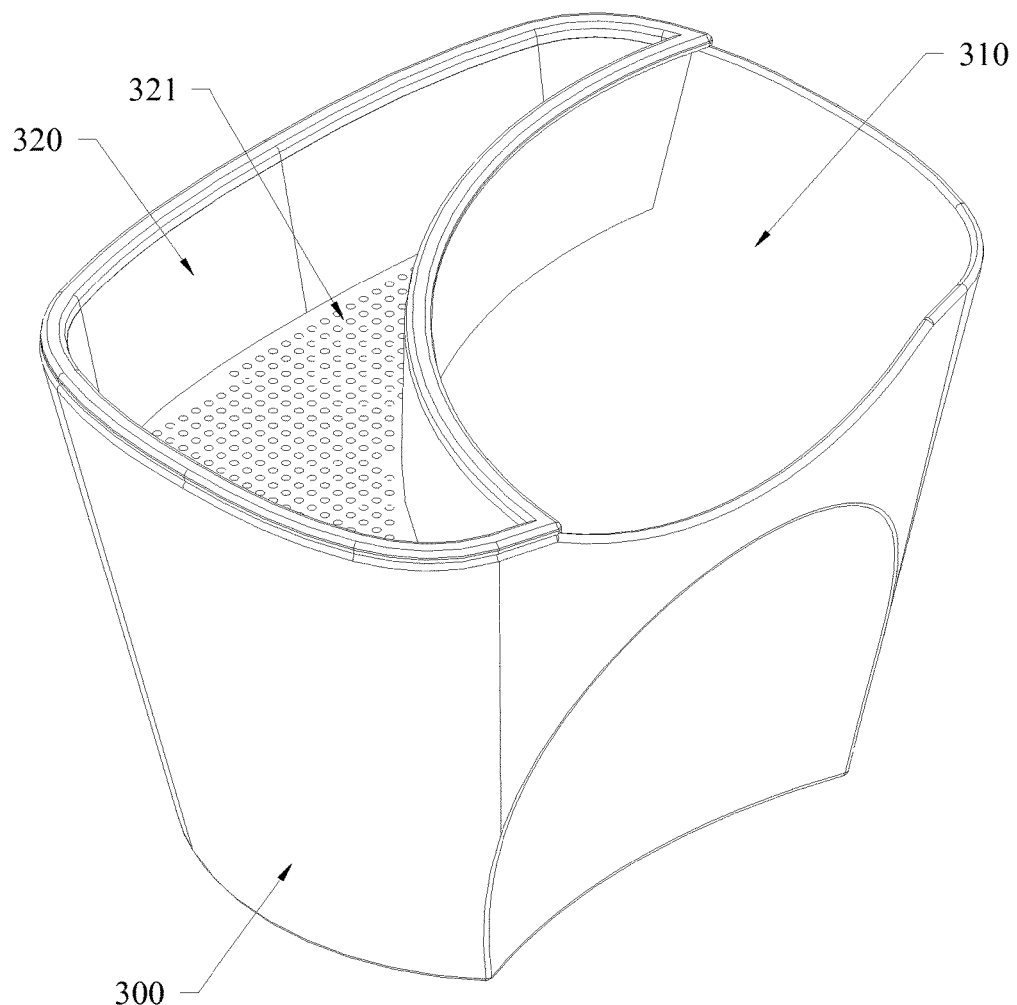
FIG. 9 shows a perspective view of a receiver for juice and residue of the first embodiment of the present invention.

In the first embodiment, as shown in FIG. 6a to FIG. 6e, the fruits or vegetables will gradually be under pressure, being cut, squeezed and discharged through the passage for fruits and vegetables 130 step by step. As shown in FIG. 6a, after being put into the container 110, the fruits or vegetables are brought to the input portion 131 of the passage for fruits and vegetables 130 following the rotation of the roller 120 in a counter-clockwise direction and pressured by the roller 120 and the container wall in the input portion 131, a part of the fruit juice or vegetable juice are squeezed out and discharged to the juice outlet 111 along the passage for fruits and vegetables 130 and out of the holes in the filter 101. As shown in FIG. 6b, the cutting plates 121a with the concave portion are cut into the squeezed fruits or vegetables in order to break them into pieces under the continuous rotational motion of the roller 120. As shown in FIG. 6c, the cutting plates 121a with the concave portion is adapted for moving a portion of fruits or vegetables being cut by the cutting plates into the enclosed spacing 133a being formed between the first cutting plate 121a with the concave portion and its preceding second cutting plate 121b. Further, the fruits or vegetables inside the above enclosed spacing 133a are then being squeezed and/or juiced while the local space 133a becomes smaller; and the fruit juice or vegetable juice are discharged from the juice outlet 111 as well. As shown in FIG. 6d, the remaining fruits or vegetables being cut and/or scrapped by the first cutting plate 121a with the concave region are pushed by the following cutting plate 121 into the passage for fruits and vegetables 130 and put into the following enclosed spacing 133b. Similarly, the spacing between the roller 120 and the container wall becomes smaller along with the rotation of the roller 120 to make the enclosed spacing become smaller so that the remaining portion of the fruits or vegetables can be squeezed or juiced completely and thus achieve the purpose of thoroughly juicing. As shown in FIG. 5a to FIG. 5d and FIG. 6e, the completely squeezed fruits or vegetables form residues, which are brought to the residue outlet 112 by the second cutting plate 121b. Preferably, a small spacing between the roller 120 and the container wall is provided. On one hand, the first or second cutting plate 121 is easy to push the residues to discharge out from the container through the residue outlet 112. On the other hand, the first or second cutting plate 121 is pressured by the container wall, the cutting plate will then be forced into and projected out from the corresponding cutting plate receiver 122 by way of sliding motion of the first or second cutting plate 121 along the cutting plate receiver 122. As such, it is beneficial for the first or second cutting plate 121 to scrape the large fruits or vegetable into the passage for fruits and vegetables 130 through the input portion 131.

As shown in FIG. 1, FIG. 2, FIG. 3, FIG. 4, FIG. 7 and FIG. 8, in the first embodiment, a shaft hole 126 is arranged at the ends of the roller 120. The driving device comprises a driving shaft 210 adapted for driving the roller 120 to be rotated, a support member 220 adapted for supporting the driving shaft 210 and a driving member for driving the driving shaft 210 to be rotated. The supporting member 220 is fixedly arranged on the outer wall of the container 110. Alternatively, the supporting member 220 can be removably mounted to the base 240. One end of the driving shaft 210 is adapted to be corresponded with the cylindrical member 500 of the roller 120 in order to drive the roller 120 to be rotated. A shaft hole 126 being arranged on an end of the cylindrical member 500 is adapted for receiving the shaft end 404 of the driving shaft 210 on the supporting member 220. The driving member can be a turning handle or a driving machine mounted to the driving shaft 210, which can drive the driving shaft 210 to be rotated. In this embodiment, the driving member is the turning handle 230. The turning handle 230 comprises a connecting rod 231 fixedly arranged at the other end of the said driving shaft 210 and a handle 232 fixedly arranged on the connecting rod 231, wherein the connecting rod 231 is arranged vertically to the said driving shaft 210 and the handle 232 is arranged horizontally to the driving shaft 210. The driving shaft 210 can be driven to be rotated relative to the shaft hole 126 of the roller when the handle 232 is held to be rotated. Preferably, the container 110 is mounted on the base 240.

As shown in FIG. 1, FIG. 2, FIG. 3, FIG. 4 and FIG. 9, in the first embodiment, a receiver for juice and residue 300 adapted for receiving the fruit juice or vegetable juice and fruit residues is arranged below the container 110. The receiver for juice and residue comprises a juice receiver 310 adjacent to the juice outlet 111 and a residue receiver 320 adjacent to the residue outlet 112. A circulating passage may be arranged between the juice receiver 310 and the juice outlet 111 according to the need, so that the fruit juice or vegetable juice discharged from the juice outlet 111 is received in the juice receiver 310; in the same way, a slide for fruit residues may be arranged between the residue receiver 320 and the residue outlet 112 according to the need, so that the fruit residues discharged from the residue outlet 112 is received in the residue receiver 320 through the slide for residues. In this embodiment, the residue receiver 320 is directly arranged below the residue outlet 112 and the juice receiver 310 is arranged below the juice outlet 111. Preferably the residue receiver 320 is arranged above the juice receiver 310, a plurality of juice holes 321 forming a passage to the juice receiver 310 are arranged on the bottom of the residue receiver 320. As such, the remaining fruit juice or vegetable juice in the residues can also be collected into the juice receiver 310 through the juice holes 321. In order to block up the container to conveniently put the receiver for juice and residue 300, a base 240 can be arranged at the bottom of the supporting member 220. The base 240 is fixedly mounted to the supporting member 220.

In the first embodiment, in order to preventing the receiver for juice and residue 300 from moving or vibrating, it is preferable that a longitudinal convex member 241 is arranged on a side of the base 240 adjacent to the receiver for juice and residue 310 and a longitudinal concave region (not shown in figures) adapted for receiving the longitudinal convex member 241 is arranged on the receiver for juice and residue 300. In case the longitudinal convex member 241 is inserted into the longitudinal concave region of the receiver 300, the movement or vibration of the receiver for juice and residue in the horizontal direction can be restricted in order to ensure the residues and juice can smoothly enter into the receiver for juice and residue 300.

In the first embodiment, alternatively, the longitudinal convex member 241 can be removably mounted on the inner wall of the receiver 300 in order to restrict the movement of the receiver 300 and mount the receiver 300 onto the base 240. Further, the base 240 comprises a mounting member adapted for mounting the juicer on a surface of an object and reducing the vibrational force during juicing process. The mounting member can be a structure adapted for adjusting the volume between the bottom of the base 240 and a surface of an object. The mounting member comprising a plastic ring member adapted for restricting the air from entering into the mounting member and a central portion having a hole adapted to remove the air inside the mounting member. The movement of the longitudinal convex member 241 can drive the plastic ring member to a contracting state or a holding state or shape in contracting in order to allow the air inside the mounting member to be moved out from the mounting member. Therefore, the mounting member will then become a vacuum mounting member. Due to the existence of negative pressure inside the mounting member, the base 240 will then be attached to a surface of the object. In order to release the base 240 from the surface, the longitudinal convex member 241 can be moved to an alternative direction to drive the plastic ring member to a releasing state or a shape in a releasing state in order to allow the air entering into the mounting member such that the base 240 can be released from the surface.

Figure 5A:
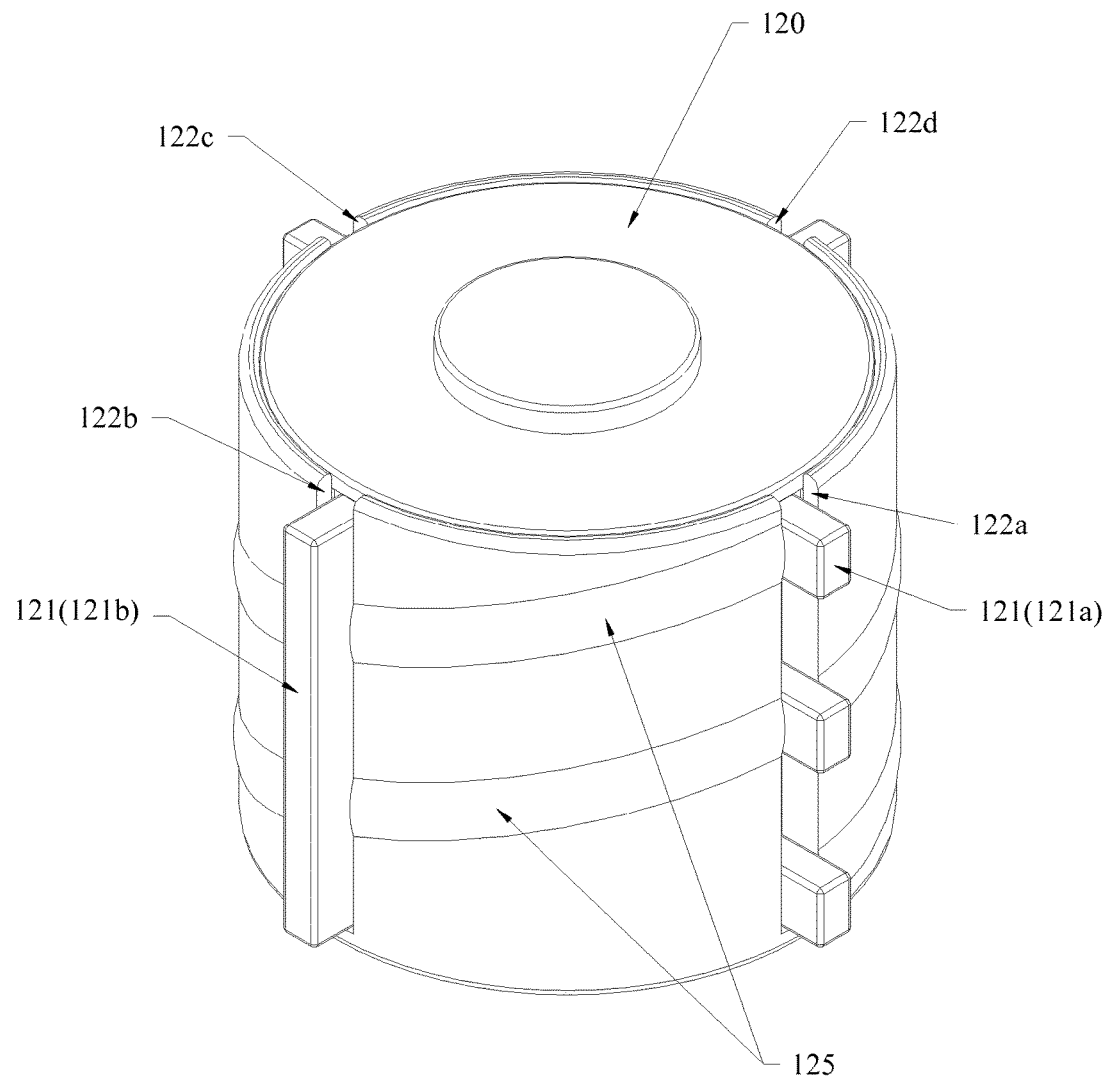
FIG. 5a shows a perspective view of a roller of the first embodiment of the present invention.
Figure 5B:
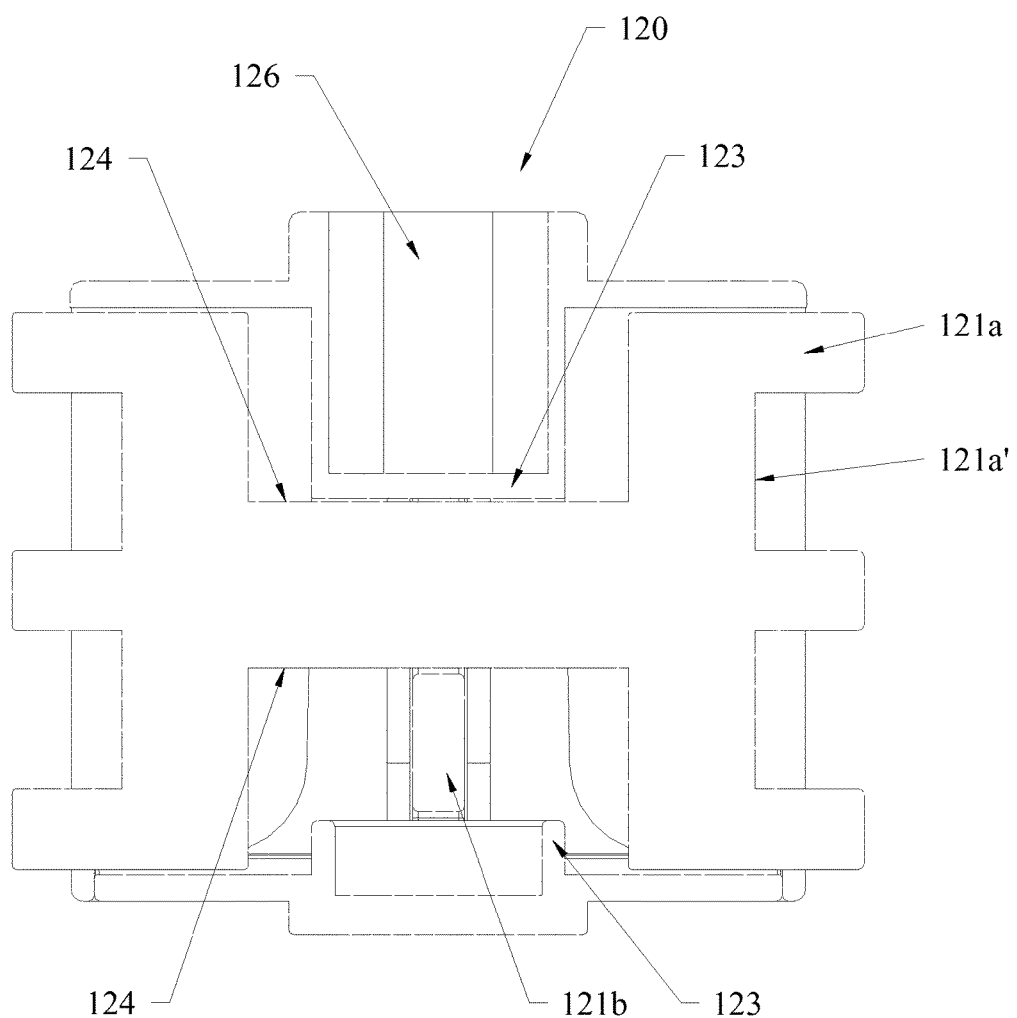
Figure 5E:
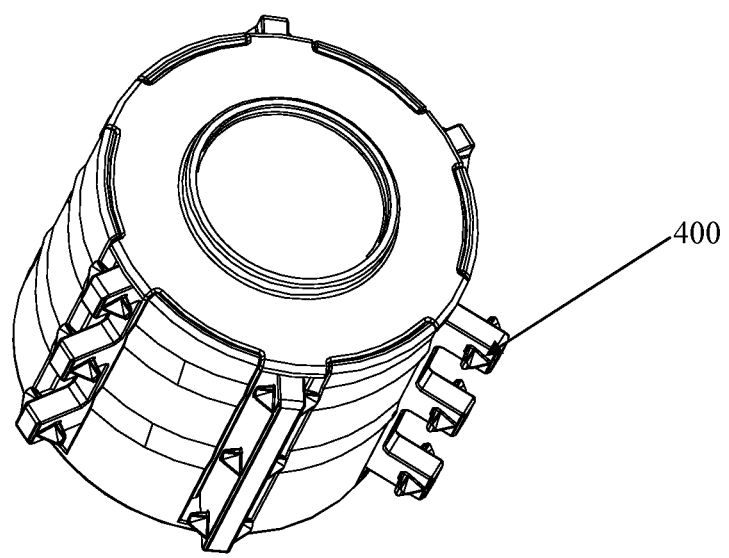
FIG. 5e shows a perspective view of a roller of a second embodiment of the present invention.
Figure 5F:
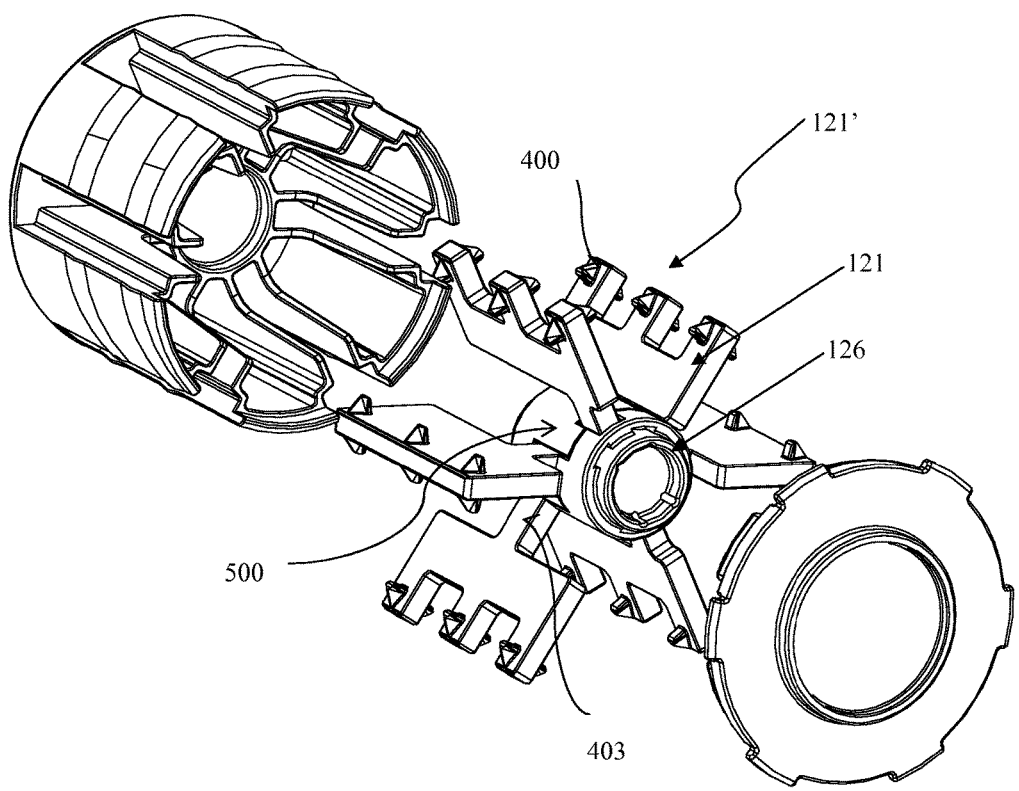
FIG. 5f shows an exploded view of the roller of FIG. 5e.
Figure 5G:
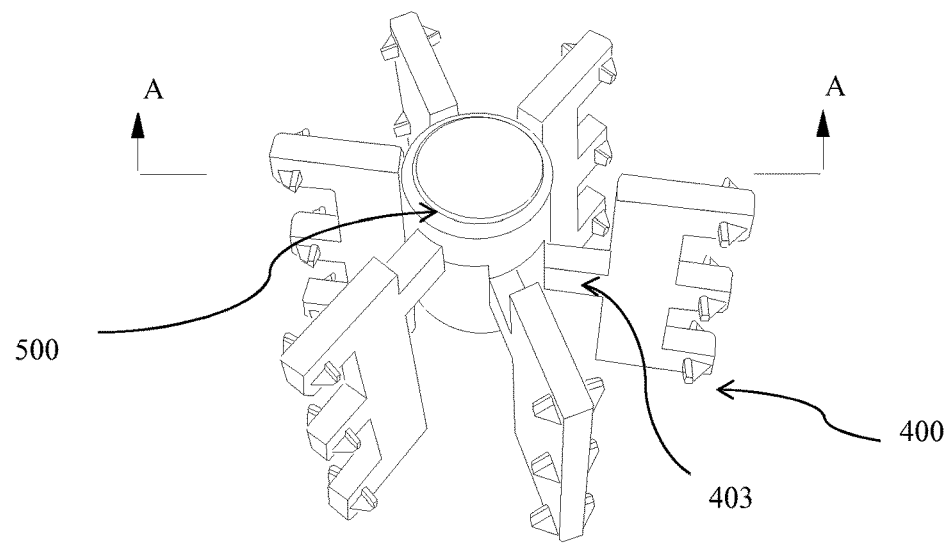
FIG. 5g shows the cutting plates of the roller of FIG. 5e.
Figure 5H:
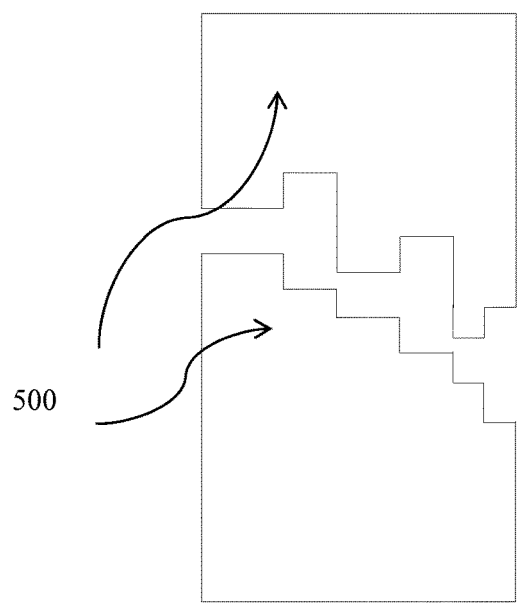
FIG. 5h shows a sectional A-A view of FIG. 5g.
Figure 10:
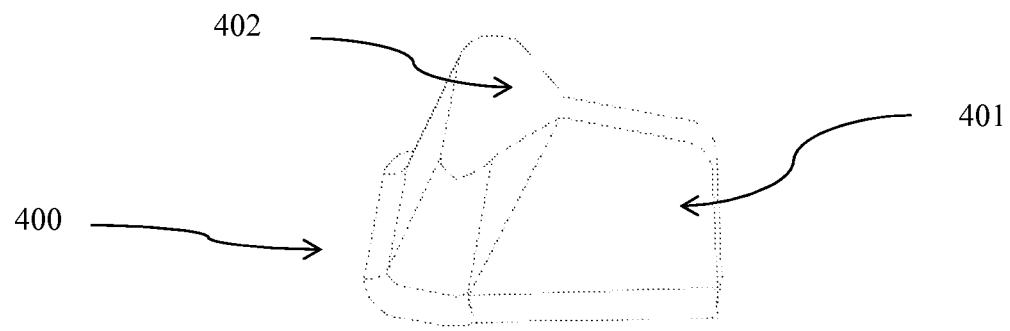
FIG. 10 shows a perspective view of a cutting member of the roller of FIG. 5e.
Figure 11:
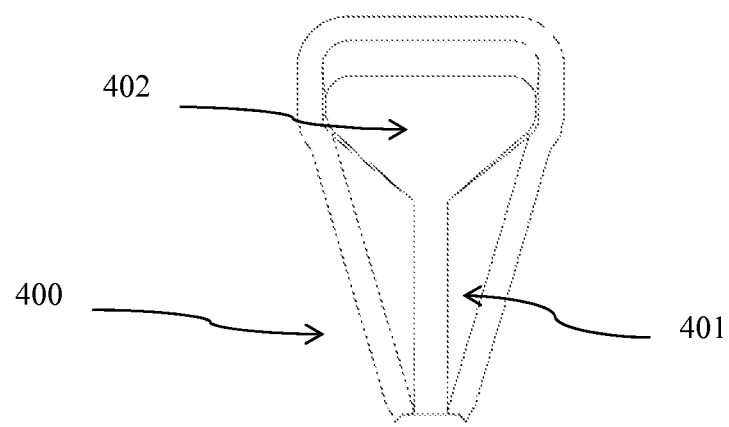
FIG. 11 shows a top view of FIG. 10.
Figure 12:
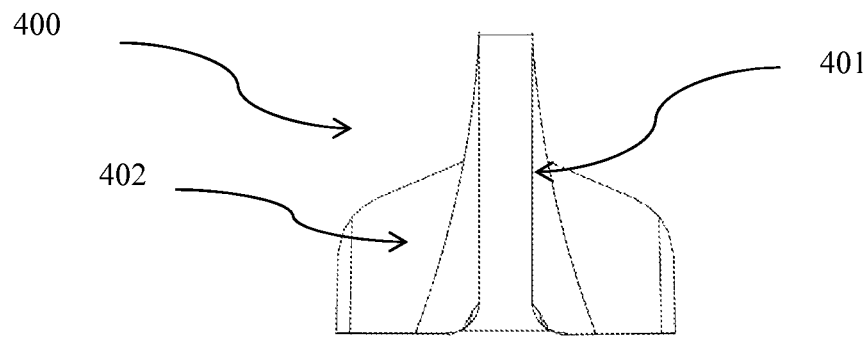
FIG. 12 shows a front view of FIG. 10.
Figure 13:
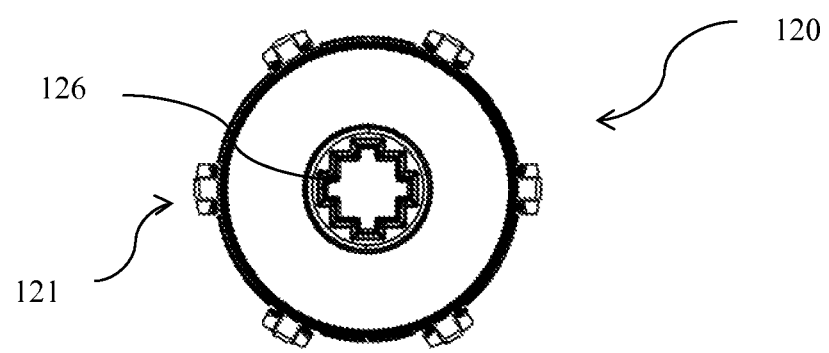
FIG. 13 shows a front view of the end of the roller of FIG. 5e.
Figure 14:
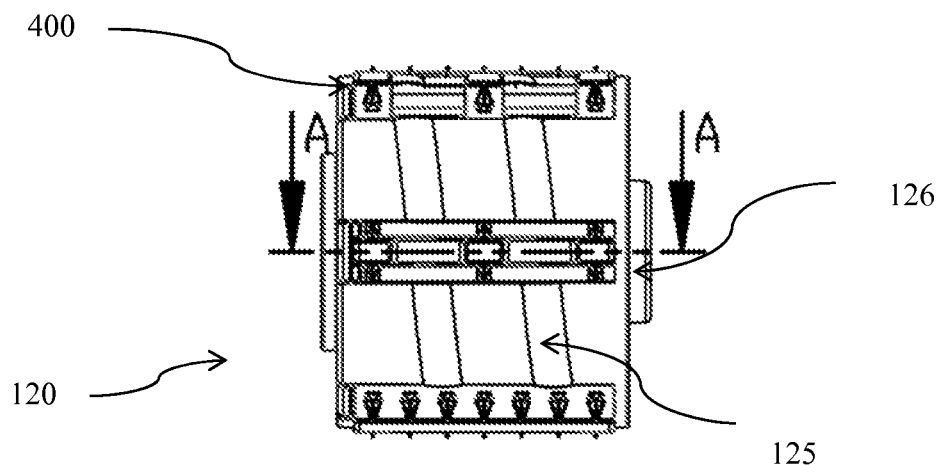
FIG. 14 shows a side view of the roller of FIG. 5e.
Figure 15:
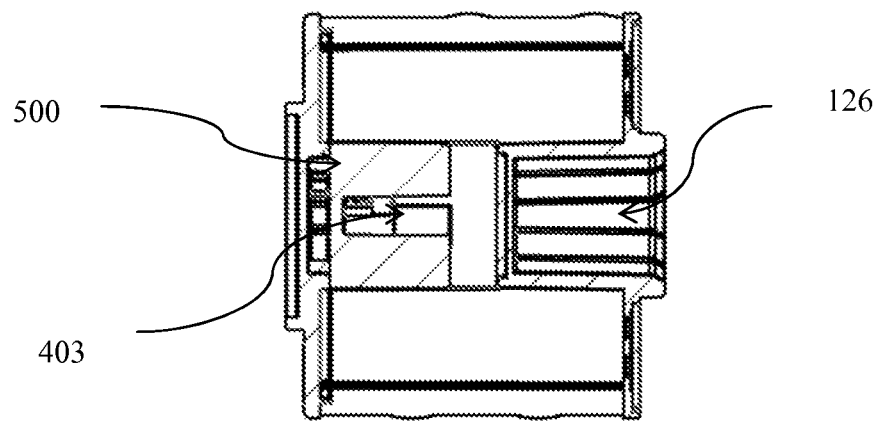
FIG. 15 shows a sectional A-A view of FIG. 14.

In the second embodiment, FIG. 10, FIG. 11 and FIG. 12 show the sharp convex structure or the cutting member 400 of FIG. 5e to FIG. 5g. As shown in FIG. 5e, FIG. 5f, FIG. 5g, FIG. 10, FIG. 11 and FIG. 12, the cutting member or the sharp convex structure 400 solves the existing technical problem that the cutting plates of the existing technology cannot mount the fruits or vegetables or food being cut by the existing cutting plates during the rotational cutting process performed by the roller 120. The residues which are not completely cut or pressured is easily discharged through the residue outlet 112 (see FIG. 6a to FIG. 6e). Alternatively, referring to FIG. 10, FIG. 11 and FIG. 12, the cutting member or the sharp convex structure 400 comprising a cutting portion 401 and a food mounting portion 402 forming a T shaped structure is mounted on the first and second cutting plates 121. The cutting portion 401 of the cutting member or the sharp convex structure 400 is of a longitudinal shaped structure having a sharp edge located at a first end of the cutting portion, the cutting portion 401 is arranged along a line of motion of rotation of the roller 120. The cutting portion 401 is used to cut the food inside the container 110 or the passage 130 (see FIG. 6a to FIG. 6e). The food mounting portion 402 is arranged at a position which is perpendicular to the line of motion of rotation of the roller 120. The food mounting portion 402 is adapted for mounting the fruits or vegetables being cut by the cutting portion 401 to the rollers. Specifically, the food mounting portion has a surface to break into the skins of fruits or vegetables or the residues and eventually mount to the residues in order to perform a repeated juicing process for the residues being mounted by the food mounting portion 402. The second end of the cutting portion 401 is mounted to the central part of the food mounting portion 402 such that the fruits or vegetables or residues being cut by the cutting portion 401 will be immediately mounted by the food mounting portion 402. The remaining part of the food mounting portion mounts the food being cut by the cutting portion 401. Alternatively, referring to FIG. 5e, FIG. 5f, FIG. 5g, the cutting member 400 is of a cylindrical body of triangular cross section. The first end of the cutting member 400 which is on the same direction of line of motion of rotation of the roller 120 is of a sharp edge adapted for cutting the fruits or vegetables inside the passage 130 or the container 110 (see FIG. 6a to FIG. 6e). The second and third ends of the cutting members 400 is used for the purpose of mounting the fruits or vegetables to the roller 120. When the roller 120 rotates in a clockwise direction, the cutting member 400 can mount the fruits or vegetables to the roller 120 by inserting the cutting member 400 into the skin of the fruits or vegetables.

In the second embodiment, preferably, referring to FIG. 5c, FIG. 5d, FIG. 5e, FIG. 5f and FIG. 5g, the mounting surface for mounting the fruits or vegetables to the roller 120 can be enlarged by arranging at least two cutting members or the sharp convex structure 400 to be mounted on the end portions of two opposing surfaces of the second cutting plate 121b and at least two cutting member or the sharp convex structure 400 to be mounted on the convex end portions of two opposing surfaces of the first cutting plate 121a.

Referring to FIGS. 6a to 6d, in the second embodiment, the roller 120 can be rotated in an counter-clockwise direction, the residues being mounted by the food mounting portion 402 of the cutting member or the sharp convex structure 400 cannot pass through a position of the lower region of the passage 130 according to FIG. 6d due to the little spacing between the outer surface of the roller 120 and the container wall. The counter-clockwise motion of the roller 120 allows mounting of the residues through the food mounting portion 402 in order to discharge the residues from the container 110 through the residues outlet 112. Advantageously, the cutting member or the sharp convex structure 400 is to be mounted on opposing sides of the cutting plate 121 in order to increase the mounting capacity of the cutting plates 121.

In a third embodiment, referring to FIG. 1, FIG. 7, FIG. 13, FIG. 14 and FIG. 15, the shaft hole 126 comprises a plurality of right angled structures arranged on the inner wall of the shaft hole 126. The right angled structure provides more contacting surfaces for receiving the shaft end 404. Specifically, the above arrangement of increasing the contacting surfaces provides more frictional force in order to save energy for rotating the turning handle 230. Preferably, the depth of the shaft hole 126 is of about half of the length of the cylindrical member 500 in order to provide more contacting surfaces for receiving the shaft end 404 to save more energy by increasing the frictional force between the shaft end 404 and the shaft hole 126.

Figure 16:
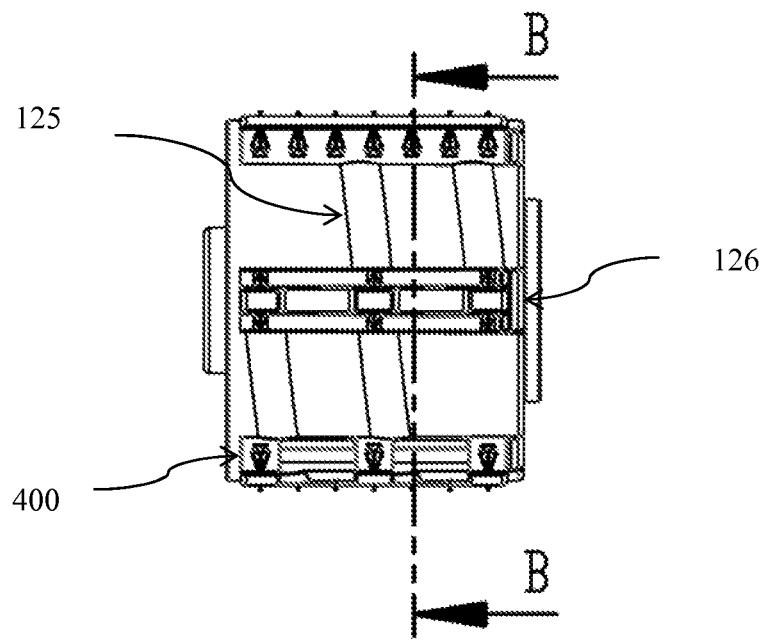
FIG. 16 shows an alternative side view of FIG. 5e.
Figure 17:
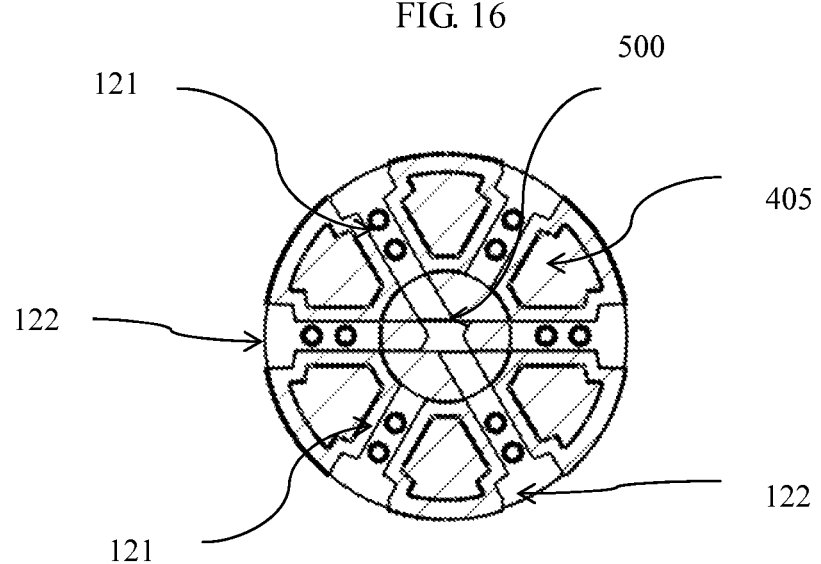
FIG. 17 shows a sectional B-B view of FIG. 16.

In a fourth embodiment, referring to FIG. 16 and FIG. 17, it is preferably that the remaining portion 405 of the roller 120 comprises a solid structure in order to provide more weight for rotation motion of the roller 120. Specifically, due to the principle of inertia and the increase in weight of the remaining portion 405, the user is not required to apply much force to rotate the turning handle 230 in order to allow the roller 120 to be rotated. The energy can therefore be saved in using the juicer of the fourth embodiment. Further, the solid structure is used to completely fill in the remaining portion 405 of the roller 120 and is adapted for disallowing the residues or juices inside the container 110 from entering into the remaining portion 405 in order to solve the hygienic problem appearing inside the roller 120.

Alternatively, as shown in FIG. 17, the solid structure is adapted for mounting on an inner wall of the remaining portion 405. Preferably, the roller 120 is made of plastic. Alternatively, the solid structure is technically not easy to be unitary formed with the remaining portion 405 during the manufacturing process such that both the solid structure and the remaining portion 405 can be made of homopolymer material for purpose of forming a unitary structure through chemical bonding.

While a specific embodiment of the invention has been shown and described in detail to illustrate the inventive purposes, it will be understood that the invention may be embodied otherwise without departing from said principles.

The invention claimed is:

1. A juicer comprising a juicing device and a driving device adapted for driving said juicing device, wherein said juicing device comprises a container and a roller being rotatably mounted inside said container, said roller is adapted to be driven by said driving device, said roller comprises first and second cutting plates being projected outwardly from an outer surface of said roller, a juice outlet and a residue outlet are positioned on a container wall, a plurality of cutting plate receivers is arranged on the outer surface of said roller and is adapted for allowing said first and second cutting plates to be slidingly mounted inside said cutting plate receivers, said first cutting plate comprises at least one cutting member having a convex structure mounted on a surface of said first cutting plate;

wherein said cutting member comprises a cutting portion adapted for cutting the food inside said container and a food mounting portion adapted for mounting the food inside said container; and wherein said roller further comprises a cutting plate means adapted for slidingly mounting said first and second cutting plates and allowing said first and second cutting plates to be moved radially inside said roller;

wherein said cutting plate means comprises a first and second portions, said first and second portions are removably mounted together and defined as a cylindrical member, opposing ends of said first and second portions comprise trapezoid structures.

2. The juicer according to claim 1, wherein said at least one cutting member is vertically mounted on a surface of said first and second cutting plates.

3. The juicer according to claim 1, wherein said first cutting plate comprises an extending member mounted to an end of said first cutting plate, at least two said cutting members are vertically mounted to an end portion of the opposing surfaces of said extending member.

4. The juicer according to claim 2, wherein at least two cutting members are vertically mounted to first and second surfaces of said second cutting plate.

5. The juicer according to claim 1, wherein said cutting plate means comprises a cutting plate extending member and a cylindrical member, two opposing end portions of said cutting plate extending member are mounted to inner end portions of a pair of said first or second cutting plates, said cylindrical member is adapted for allowing said cutting plate extending member of said first and second cutting plates to be slidingly mounted to said cylindrical member, said cutting plate extending member is mounted between a pair of said first cutting plates, said cutting plate extending member is mounted between a pair of said second cutting plates, opposing ends of said cutting plate means are removably mounted to inner end surfaces of said roller.

6. The juicer according to claim 5, wherein the length of an end of said cutting plate extending member is less than the length of an inner end of said first or second cutting plate.

7. The juicer according to claim 5, wherein said cutting plates means comprises at least two holes for receiving said cutting plate extending member, said cutting plate extending member is adapted to move along two said holes, the width of said hole is less than the length of the end of said first or second cutting plate adjacent to said cutting plate extending member.

8. The juicer according to claim 1, wherein said cutting plate receiver comprises a cutting plate receiver wall, the side of said cutting plate receiver is extending towards the central axis of said roller.

9. The juicer according to claim 5, wherein two said first or second cutting plates and said cutting plate extending member unitarily form an "H" shaped structure.

10. The juicer according to claim 1, wherein a receiver for juice and residue is arranged below said container, said receiver for juice and residue comprises a juicer receiver adjacent to said juice outlet and a residue receiver adjacent to said residue outlet, said residue receiver is arranged above said juicer receiver, a plurality of juice hole forming a passage to said juice receiver are arranged on the bottom surface of said residue receiver, a longitudinal convex member being arranged on a side of a base of said juicer is mounted to a surface of said receiver for juice and residue, said base comprises a mounting member adapted for mounting said juicer on a surface of an object and reducing the vibrational force during the juicing process.

11. The juicer according to claim 1, wherein said juice outlet is a hole arranged on said container wall, said hole is covered by a filter.

12. The juicer according to claim 1, wherein said cutting plate receiver is arranged inside said roller, said first or second cutting plate is slidingly mounted inside said cutting plate receiver, a remaining portion of said roller comprises a solid structure adapted for disallowing the residues or juices inside said container from entering into said remaining portion.

13. The juicer according to claim 1, wherein said outer surface of said roller comprises a convex threaded structure.

14. The juicer according to claim 1, wherein said cutting plate receiver is arranged towards the center axis of said roller, said first or second cutting plate is adapted to be move radially along said cutting plate receiver.

15. The juicer according to claim 1, wherein said first or second cutting plate is slidingly mounted along two said opposing cutting plate receivers.

16. The juicer according to claim 5, wherein said outer surface of said roller comprises an inclined convex structure, a shaft hole of said cylindrical member comprises a plurality of right angled structures arranged on the inner wall of the shaft hole, the spacing between said roller and said container wall forming a passage for fruits and vegetables, said passage for fruits and vegetables comprises an input portion adapted for allowing fruits or vegetables entering into said passage for fruits and vegetables and an output portion adapted for discharging fruits or vegetables from said passage for fruits and vegetables, the spacing between said roller and said container wall adjacent to said input portion is larger than the spacing between said roller and said container wall adjacent to said output portion.

17. The juicer according to claim 16, wherein the spacing between said roller and said container wall is gradually decreased from said input portion to said output portion of said passage for fruits and vegetables, said driving device comprises a driving shaft adapted for rotating said roller, a supporting member mounted to said container, a driving member adapted for driving said driving shaft and a shaft hole arranged on an end of said cutting plate means, said driving member is a turning handle or a machine.

* * * * *